Figure 1:
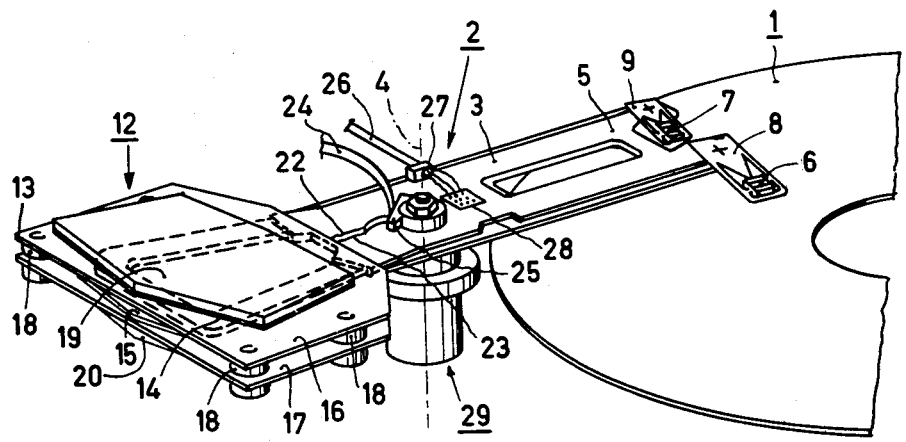

United States Patent [19]

Dijkstra

[11] 4,150,407
[45] Apr. 17, 1979

[54] ELECTRICALLY CONTROLLABLE CARRYING-ARM ARRANGEMENT

[75] Inventor: Durk Dijkstra, Zoetermeer, Netherlands

[73] Assignee: U.S. Philips Corporation, New York, N.Y.

[21] Appl. No.: 846,434

[22] Filed: Oct. 28, 1977

[30] Foreign Application Priority Data

Nov. 9, 1976 [NL] Netherlands .......................... 7612401

[51] Int. Cl.² ............................................. G11B 21/02
[52] U.S. Cl. .................................................... 360/106
[58] Field of Search ......................... 360/106, 104–105, 360/97–99, 103, 75, 78

[56] References Cited

U.S. PATENT DOCUMENTS 4,019,205  4/1977  Salmond et al. ...................... 360/105

FOREIGN PATENT DOCUMENTS 2209522  9/1972  Fed. Rep. of Germany ............ 360/106
1440455  6/1976  United Kingdom ..................... 360/106

OTHER PUBLICATIONS

IBM Technical Disclosure Bulletin, vol. 19, No. 4, Sep. 76, p. 1440, "Actuator Refraction Device", by Hearn.
IBM Technical Disclosure Bulletin, vol. 17, No. 10, Mar. 75, pp. 3016–3018, "Desk File Actuator", by Lissner et al.
Patent Associated Literature—IBM Journal of Research Development, vol. 20, No. 4, pp. 389–397, Jul. 1976, "Design of a Swinging Arm Actuator", by Heath.

Primary Examiner—John H. Wolff
Attorney, Agent, or Firm—Thomas A. Briody; William J. Streeter; Simon L. Cohen

[57] ABSTRACT

An electrically controllable carrying arm arrangement for a magnetic disc store and comprising a carrying arm which at one of its ends carries a number of magnetic heads and at its other end is provided with a drive coil with the aid of which the carrying arm is pivoted, so that the magnetic heads are moved over the surface of a storage disc. The drive coil has a flat shape and a small thickness and moves in an air gap between two flat axially magnetized permanent magnets which belong to a stator of the arrangement. Preferably, the drive coil and the carrying arm are disposed in one plane which is perpendicular to the pivoting axis of the carrying arm, so that a compact unit is obtained which demands little mounting height. When a multiple carrying arm arrangement is desired, a plurality of carrying arms of the type described hereinbefore are stacked onto each other with intermediate spacings, while the stator construction is also obtained by stacking a plurality of stators. However, when n individual carrying arms are used and thus n separate stators, it suffices to use n+1 permanent magnets so that each magnet which is disposed between two drive coils cooperates with both drive coils.

2 Claims, 5 Drawing Figures

ELECTRICALLY CONTROLLABLE CARRYING-ARM ARRANGEMENT

The invention relates to a single electrically controllable carrying-arm arrangement for an apparatus by means of which information can be recorded on and/or read from a movable flat information carrier, in particular a rotatable flat disc such as a magnetic storage disc or an optically readable video disc, and comprising: a carrying arm in the form of a two-armed lever which is pivotable about a pivoting axis and which has a first and a second end; at least one head for recording or reading or for recording and reading information, which head is secured to the first end of the carrying arm; and electromagnetic electrically controllable drive means for the carrying arm, comprising a stator with permanent magnetic means which produce a permanent magnetic field, as well as a drive coil which turns an electrically conducting material which coil is connected to the second end of the carrying arm and is movable in the permanent magnetic field of the stator for pivotally driving the carrying arm.

Such carrying arm arrangements are known and are for example employed in magnetic disc stores for the temporary storage of computer data (German Offenlegungsschrift DT-OS No. 2,209,522). Carrying arm arrangements of this type have also been proposed for use in conjunction with video discs. The head which is secured to the carrying arm in the first case consists of a magnetic head and in the second case of an optical system with which a light beam can be projected on to the video disc and with which, as the case may be, a light beam which has been reflected by the video disc and has been modulated by the information on said disc can be picked up again. In the scope of the present Application the term "head" is to be understood to mean any system or element with which signals can be recorded on an information carrier and/or read from said carrier. The carrying arm arrangement known from the said German Offenlegungsschrift DT-OS No. 2,209,522 comprises a so-called E-stator and a substantially annular drive coil which fits around the center limb of the E with play. Such a construction demands a comparatively great mounting height, which therefore to a considerable extent determines the total height of the disc store, which comprises only one storage disc.

In the present Application the invention will be described mainly with reference to the present state of the art in respect of carrying arm constructions for magnetic disc stores. However, this does not imply that the invention is limited to this field.

In known magnetic disc stores with a multiplicity of storage discs these discs are jointly mounted on a single rotating spindle. Each magnetic disc cooperates with a carrying arm on at least one and usually on both sides. Consequently, a plurality of carrying arms are used in the case of disc stores with a multiplicity of storage discs. The electromagnetic drive means to which electrical signals are applied for moving the carrying arms and thus for controlling the position of the magnetic heads relative to the rotating magnetic discs, move the carrying arms jointly as one unit and their dimensions should therefore be adapted to the number of carrying arms used. A consequence of this is that when magnetic disc stores with different numbers of storage discs are manufactured it is also necessary to manufacture a corresponding number of separate carrying arm arrangements adapted to the relevant disc stores and always having different electromagnetic drive means.

There is a trend to control carrying arm arrangements of magnetic disc stores with the aid of servo-electronics. The lower storage disc comprises a plurality of tracks, generally on the underside, which each contain information in respect of the position of the track on the storage disc. A magnetic head which is mounted on a carrying arm cooperates with these tracks and is thus capable of reading the position of the carrying arm arrangement relative to the storage discs. The positional information is applied to the servo-electronics which control the carrying arm arrangement with the aid of said information. As the dynamic behavior of the carrying arm arrangement is dependent on the number of individual carrying arms, a further consequence for the manufacture of disc stores of this type with different numbers of storage discs is that each time it is also necessary to develop and manufacture different servo-electronics circuits which are each adapted to the number of discs in a disc store. Thus, this means that when a manufacturer manufactures X magnetic disc stores with different numbers of storage discs, he must also develop, manufacture and stock X different electromagnetic drive means as well as X different servo-electronics circuits.

It is an object of the invention to provide a carrying arm arrangement which in comparison with the present state-of-the-art has the advantage that when a single carrying arm arrangement is employed its mounting height is smaller and when a multiple carrying arm arrangement is employed this can simply be assembled from a plurality of single carrying arm arrangements. For this purpose a single electrically controllable carrying arm arrangement in accordance with the invention is characterized in that each of the turns of the drive coil is disposed in a plane which is perpendicular to the pivoting axis of the carrying arm; that the drive coil has a substantially flat overall shape with a thickness which, measured in the direction of the pivoting axis of the carrying arm axially is substantially smaller than its other dimensions; and that the permanent magnetic means of the stator comprise flat axially magnetized permanent magnets which are axially disposed on both sides of the drive coil so that an air gap is formed.

The small mounting height of such a carrying arm arrangement is mainly due to the small height which is required for the drive coil and the permanent magnetic stator. An additional advantage is that it is comparatively simple to produce a permanent magnetic field which is substantially constant over the entire range of co-operation with the drive coil, so that a satisfactory linearity of the carrying arm control is assured.

An embodiment of the invention by means of which a minimal mounting height can be obtained in combination with a simple construction is characterized in that the drive coil and the carrying arm are both substantially disposed in the same plane perpendicular to the pivoting axis of the carrying arm.

A correct fixation of the flat drive coil to the carrying arm can be obtained in an embodiment of the invention in which the carrying arm consists of two sheet material parts which are rigidly connected to each other, the drive coil being secured to the second end of the carrying arm between said two parts.

The invention also relates to multiple electrically controllable carrying arm arrangements for an apparatus with which information can be recorded on and/or read from a plurality of movable flat information carriers, in particular rotatable discs, such as a coaxial stack of a plurality of magnetic storage discs or optically readable video discs which are spaced from each other and which are rotatable about a common axis of rotation, with a plurality of carrying arms which are pivotable about a single common pivoting axis and with a common stator. In accordance with the invention such a multiple carrying arm arrangement is characterized in that the carrying arm arrangement comprises a plurality of single carrying arm arrangements as claimed in claim 1, the carrying arms being stacked coaxially with intermediate spacings; and that the common stator consists of a stack of individual stators associated with the individual carrying arms, such that each flat permanent magnetic which is disposed between two drive coils of two adjoining carrying arms co-operates both with the one drive coil and with the other drive coil, so that in the case of n carrying arms and thus n drive coils, n+1 flat permanent magnets are utilized.

Such a multiple carrying arm arrangement enables a more rational manufacture of magnetic disc stores. Different types of discs stores, each suitable for a different number of storage discs, can be manufactured on the basis of the same components, namely by each time stacking the same carrying arms and stator components in the required quantities. The servoelectronics can be identical for the different types of disc stores, because for each additional carrying arm the associated electromagnetic drive means are also added. The dynamic properties of a carrying arm arrangement thus hardly vary with the number of carrying arms. It is true that the addition of a carrying arm increases the moving mass, but at the same time the power available for driving is increased accordingly. It has been found that in this way disc stores with a number of storage discs varying between one and five can be manufactured, which can also be controlled with the same servoelectronics circuit.

In accordance with the invention it is possible to realize an embodiment having special advantages over the known multiple carrying arm arrangement. This embodiment is characterized in that at least one of the individual carrying arms is pivotable about the common pivoting axis independently of the other carrying arms. Such multiple carrying arm arrangements are particularly suitable for use in conjunction with an electrical control system by means of which each individual carrying arm can separately be moved relative to an individual magnetic disc. The position of the individual carrying arm relative to its associated storage disc is then determined by means of information contained on a storage disc. The individual movable carrying arms are thus each controlled by an individual control circuit. An extension of the number of individually controllable carrying arms in this embodiment of the invention consequently means an extension of the number of individual control circuits, but without the necessity of mutually different control circuits.

Figure 2:
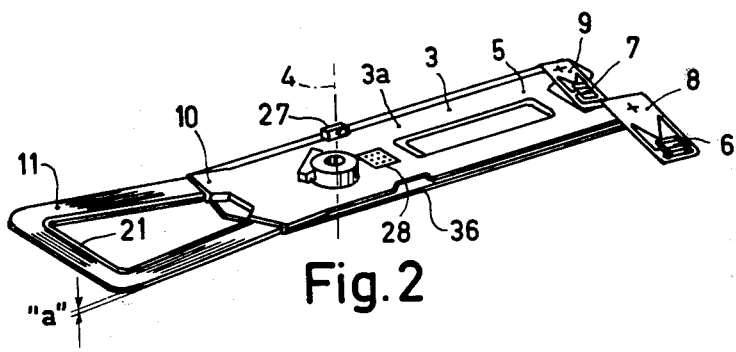
Figure 3:
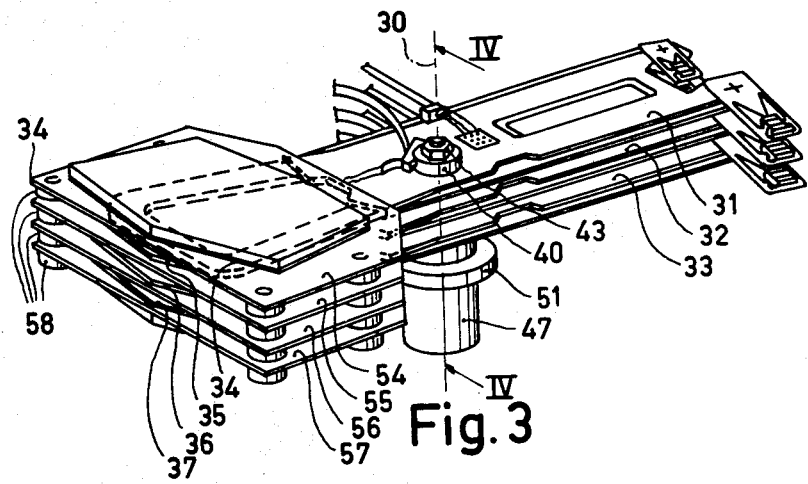
Figure 4:
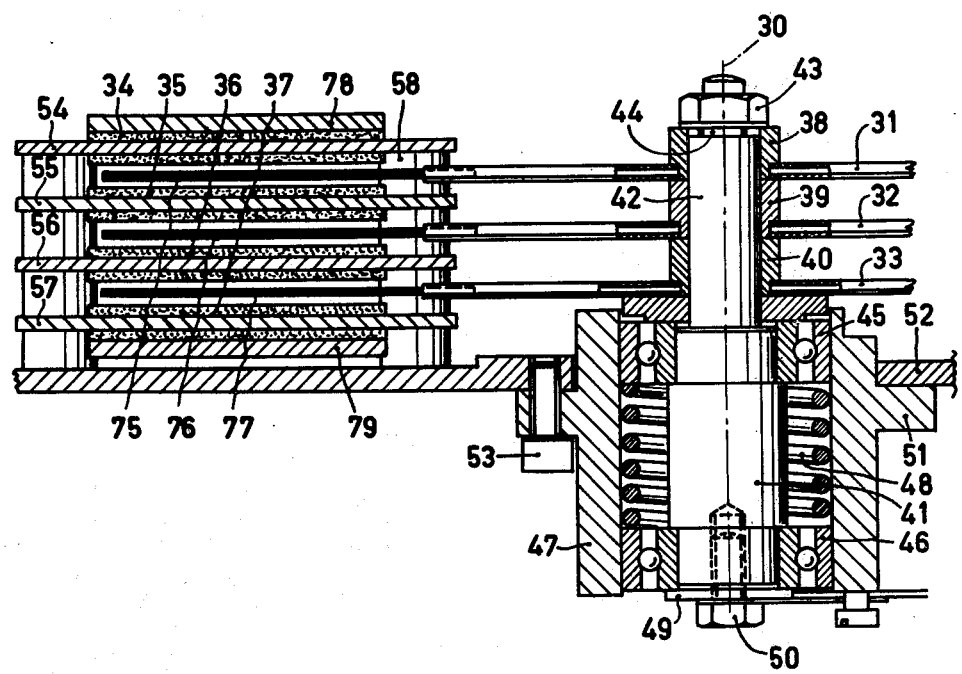
Figure 5:
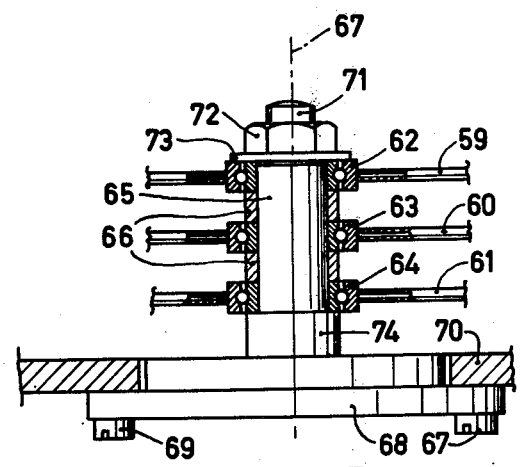

The invention will now be described in more detail with reference to a number of schematic examples which are shown in the drawing, in which:

FIG. 1 is a perspective view of a single electrically controllable carrying arm arrangement in accordance with the invention for use in a magnetic disc store with one storage disc, FIG. 2 is a perspective view of the carrying arm used in FIG. 1, FIG. 3 is a triple electrically controllable carrying arm arrangement for a disc store with three storage discs and with three jointly pivotable carrying arms in accordance with FIG. 2 and with a stator which is constructed by stacking components identical to those which are employed in the stator of the carrying arm construction of FIG. 1, FIG. 4 is a part of a cross-section in accordance with the arrows IV—IV in FIG. 3, and FIG. 5 is a similar cross-section as in FIG. 4 of an embodiment of a triple carrying arm arrangement with three individually pivotable carrying arms.

FIG. 1 shows a part of a magnetic disc store for use in peripheral computer equipment. It comprises a storage disc 1, which is only partly shown in the Figure and which has been partly cut away, as well as an electrically controllable single carrying arm 2. Said arrangement comprises an aluminium carrying arm 3, also see FIG. 2, in the form of a two-armed lever which is pivotable about a pivoting axis 4 between the two ends of the lever. Near the end 5 of the carrying arm 3 two magnetic heads 6 and 7 are disposed which are mounted on a resilient magnetic head supports 8 and 9, which are rigidly connected to the carrying arm 3. When the disc is stationary the two magnetic heads bear on the surface of the magnetic disc 1, which in known manner is provided with a magnetizable smooth surface layer. However, when the magnetic disc rotates at its operating speed, the magnetic heads 6 and 7 float on an air-cushion which is formed by the boundary layer at the location of the magnetic heads. The change in height to which the magnetic heads 6 and 7 are thus subjected relative to the surface of the storage disc causes the resilient magnetic head supports 8 and 9 to bend slightly, said supports also providing a force which urges the magnetic heads onto their air cushions. To the other end 10 of the carrying arm 3 a drive coil 11 is secured. This coil belongs to the electromagnetic electrically controllable drive means 12 with which the carrying arm 3 can be made to pivot about its pivoting axis 4 so as to enable the magnetic heads 6 and 7 to be moved over the storage disc 1 in a substantially radial direction. In addition to the drive coil 11 said drive means comprise a stator 13. This stator has two permanent magnets 14 and 15 which are glued in two aluminium supports 16 and 17.

As can be seen in FIG. 2 the turns of the drive coil 11 are disposed in a plane which is substantially perpendicular to the pivoting axis 4 and the drive coil has a substantially flat overall shape with a thickness "a" which is appreciably smaller than its other dimensions. The permanent magnets 14 and 15 of the stator 13 are flat permanent magnets which are magnetized in the direction of the pivoting axis 4, which magnets by means of four spacers 18 are axially mounted on both sides of the drive coil 11 at such a distance that between the drive coils of each permanent magnet a small air gap is formed. On the side of each permanent magnet which faces away from the drive coil 11 flat soft-iron closing plates 19 and 20 are mounted so as to complete the magnetic circuit. Also see FIG. 4.

The drive coil 11 and the carrying arm 3 are together substantially disposed in the same plane perpendicular to the pivoting axis 4, so that an as flat and as simple as possible construction of the carrying arm arrangement is obtained. The carrying arm 3 consists of two parts 3a and 3b made of aluminium sheet, which are rigidly connected to each other, for example by glueing. The drive coil 11 is a rigid assembly. The turns of the coil are wound on a plastic coil former 21 and are bonded to the coil former and to each other with the aid of a synthetic resin, so as to form a single structural unit. The unit is secured between the two parts 3a and 3b near the second end 10 of the carrying arm 3, both by clamping and by glueing.

The control voltage for controlling the position of the carrying arm 3 relative to the storage disc 1 and thus the position of the two magnetic heads 6 and 7 relative to the storage disc, is applied via two coil leads 22 and 23. A leaf spring 24, partly shown in FIG. 1, co-operates with its free end with the cam 25 which is disposed on the carrying arm 3 near the pivoting axis 4. The other end, not shown, of the leaf spring 24 is rigidly connected to stationary parts of the disc store, so that the leaf spring continuously exerts a pressure on the cam 25. This pressure results in a torque about the pivoting axis 4 which continuously tends to pivot in the carrying arm 3 into its initial position, i.e. the position in which the magnetic heads 6 and 7 are disposed at their largest radius on the magnetic storage disc 1. The leaf spring 24 also serves to carry the coil leads 22 and 23 and thus connects the drive coil 11 to an electronic control circuit for controlling the carrying-arm arrangement.

A number of wires for applying signals to and transferring signals from the two magnetic heads is combined in a flexible cable 26. A free end of the cable is fixed to the carrying arm 3 at the location of a terminal block 27. The individual wires, of which only three wires are shown in FIG. 1, are connected to a connection strip which is glued to the carrying arm 3. The connections between the connection strip 28 and the magnetic heads are not shown for the sake of simplicity. The bearing arrangement 29 of the carrying arm in accordance with FIGS. 1 and 2 will not be discussed in more detail. It is fully identical to that shown in FIG. 4.

The multiple electrically controllable carrying arm arrangement in accordance with FIGS. 3 and 4 is suitable for disc stores with three storage discs. For simplicity the storage discs are not shown, but they have the same diameter as the storage disc in accordance with FIG. 1 and are assembled to form a coaxial stack of three magnetic storage discs with intermediate spacings and are rotatable about a common axis of rotation. Three carrying arms 31, 32 and 33 are pivotable about a common pivoting axis 30, each of said arms being identical to the pivoting arm of FIG. 2. These carrying arms are located at such an axial distance from each other that the associated magnetic heads can cooperate with the storage discs. The common stator 34 comprises a stack of three stators in accordance with the stator of FIG. 1 which are associated with the carrying arms 31 through 33, in such a way that the two flat permanent magnets 35 and 36, which are respectively interposed between the two drive coils 75–76 and 76–77 of the adjoining carrying arms 31-33, cooperate with both drive coils, so that for the three carrying arms 31-33 of the arrangement of FIG. 3 and thus for the three drive coils 76-77 only four flat permanent magnets 34 through 37 are used. At the outside of 34 and 37 soft-iron closing plates 78 and 79 are located, which are similar to the closing plate 19 in FIG. 1.

FIG. 4 shows the bearing arrangement of the multiple carrying arm arrangement of FIG. 2 in cross-section. Each of the carrying arms 31, 32 and 33 is provided with a hub, designated by the reference numerals 38, 39 and 40. These hubs are connected to the associated carrying arms by pressing-in and, as the case may be, glueing. A central spindle 41 has a narrowed portion 42 on which the carrying arms are stacked. They are secured to the spindle with the aid of a nut 43 which is fitted onto a threaded portion 44 at the end of the narrowed portion 42. The spindle 41 is journalled in two ball bearings 45 and 46 which are mounted in a bearing housing 47. The ball-bearing 45 is rigidly connected to the spindle 41 and to the inside of the bearing housing 47 with the aid of a suitable adhesive. The ball-bearing 46 is urged towards one of the free ends of the spindle 41 by means of a helically wound pressure spring 48 which is retained with the aid of a closing plate 49 and a bolt 50 which is screwed into the spindle 41. The bearing housing 47 has a flange 51 for the fixation of the bearing housing to the underside of a frame plate 52 of a disc store. FIG. 4 shows that this fixation is for example possible with bolts, one of which, bearing the reference numeral 53, is shown. The manner in which the stator 34 can be secured to the frame plate 52 is not shown in FIG. 4. However, it is obvious that the magnet-mounting plates 54 through 57 and the spacers 58 may be connected to each other and to the frame plate 52 in various known manners, for example by means of screws. The spacers 58 also include the spacer with which the lower magnet mounting plate 57 is spaced from the deck plate 52.

Owing to the manner in which the individual carrying arms 31, 32 and 33 are mounted on the spindle 41 a carrying arm arrangement is obtained in which the individual carrying arms are connected to each other to form a single unit which is pivotable about the pivoting spindle 30. FIG. 5 shows a different embodiment of the invention in which the individual carrying arms, bearing the reference numeral of 59, 60 and 61, are pivotable independently of each other about a common pivoting axis 67. This demands a different bearing arrangement of the individual pivoting arms, while for the rest the pivoting arm arrangement may be identical to those of FIGS. 3 and 4. Therefore, FIG. 5 only shows the part around the bearing arrangement of the carrying arm arrangement. Each of the carrying arms 59, 60 and 61 comprises a ball-bearing (62–64) mounted therein. These bearings are mounted on a stationary journal 65 with the aid of two spacers. The journal 65 is connected to and is integral with a flange 68 which is screwed to a frame plate 70 with bolts 69. At the top the journals 65 have a threaded portion 71 onto which a nut 72 is fitted. Via a washer 73 the nut exerts pressure on the ball bearing 62 and via said bearing and via the intermediate rings 66 also on the two other ball bearings and eventually on the portion 74 of the journal. The ball bearings are thus rigidly connected to the journal 65 with their inner rings, but their outer rings are freely rotatable relative to the journal. In this embodiment the carrying arms can thus be controlled individually.

Obviously, it is also possible to construct carrying arm arrangements in more complicated versions in which some of the carrying arms which are used are rigidly mounted on a rotatable spindle, but the other carrying arms are freely pivotable relative to the spindle. Such and other embodiments, which have not been described, are also considered to form part of the invention. Furthermore, the invention may also be employed for optically readable video discs and in general in conjunction with any type of disc whose surface structure does not guide the carrying arms.

What is claimed is:

1. An electrically controllable multiple carrying arm arrangement for an apparatus wherein the major surfaces of a plurality of axially spaced coaxially rotatable information storage discs must be scanned by a plurality of information recording or reading heads, the carrying arm arrangement comprising a plurality of stacked elongated substantially flat carrying arms, each of said carrying arms being provided with a first end and a second end and all of said carrying arms being pivotal about a common pivoting axis located between the first and second ends of said elongated carrying arms, a recording or reading head being secured to the first end of each carrying arm, a substantially flat drive coil on the second end of each carrying arm and comprising a plurality of turns of wire all disposed in a plane perpendicular to the common pivoting axis and substantially within the axial dimension of each said arm;

electrical control means connected to said flat coil for controlling said arm arrangement; and a plurality of flat axially magnetized permanent magnets alternately stacked with the drive coils on the second ends of the carrying arms, each permanent magnet of the plurality of magnets that is disposed between two drive coils of two adjacent carrying arms providing a magnetic field for both of said two drive coils, the number of permanent magnets being one more than the number of carrying arms whereby the mounting height of said arm arrangement is minimized.

2. An electrically controllable multiple carrying arm arrangement as claimed in claim 1, wherein the control means permits at least one of the individual carrying arms to be pivotable about the common pivoting axis independently of the other carrying arms.

* * * * *